United States Patent
Kuang et al.

(10) Patent No.: US 11,256,737 B2
(45) Date of Patent: Feb. 22, 2022

(54) IMAGE RETRIEVAL METHODS AND APPARATUSES, DEVICES, AND READABLE STORAGE MEDIA

(71) Applicant: SHENZHEN SENSETIME TECHNOLOGY CO., LTD., Shenzhen (CN)

(72) Inventors: Zhanghui Kuang, Shenzhen (CN); Wei Zhang, Shenzhen (CN)

(73) Assignee: SHENZHEN SENSETIME TECHNOLOGY CO., LTD., Shenzhen (CN)

(*) Notice: Subject to any disclaimer, the term of this patent is extended or adjusted under 35 U.S.C. 154(b) by 114 days.

(21) Appl. No.: 16/732,241

(22) Filed: Dec. 31, 2019

(65) Prior Publication Data

US 2020/0133974 A1 Apr. 30, 2020

Related U.S. Application Data

(63) Continuation of application No. PCT/CN2018/104891, filed on Sep. 10, 2018.

(30) Foreign Application Priority Data

Sep. 27, 2017 (CN) .......................... 201710891875.9

(51) Int. Cl.
*G06F 16/55* (2019.01)
*G06K 9/42* (2006.01)
*G06K 9/62* (2006.01)

(52) U.S. Cl.
CPC .............. *G06F 16/55* (2019.01); *G06K 9/42* (2013.01); *G06K 9/629* (2013.01); *G06K 9/6215* (2013.01); *G06K 9/6218* (2013.01)

(58) Field of Classification Search
CPC ....... G06N 3/0454; G06N 3/08; G06K 9/6215
See application file for complete search history.

(56) References Cited

U.S. PATENT DOCUMENTS

2016/0321784 A1  11/2016  Annapureddy

FOREIGN PATENT DOCUMENTS

| CN | 105574215 A |   | 5/2016  |
|----|-------------|---|---------|
| CN | 106127725 A |   | 11/2016 |
| CN | 106228185 A |   | 12/2016 |
| CN | 106250812 A |   | 12/2016 |
| CN | 106649665 A | * | 5/2017  |
| CN | 106649665 A |   | 5/2017  |

(Continued)

OTHER PUBLICATIONS

International Search Report in the international application No. PCT/CN2018/104891, dated Nov. 26, 2018.

(Continued)

*Primary Examiner* — Ross Varndell
(74) *Attorney, Agent, or Firm* — Syncoda LLC; Feng Ma

(57) ABSTRACT

An image retrieval method includes: respectively performing a dimension reduction operation on convolutional layer features of an image to be retrieved to obtain dimension-reduced features; clustering the dimension-reduced features to obtain a plurality of clustering features; performing feature fusion on the plurality of clustering features to obtain a global feature; and retrieving, on the basis of the global feature, the image to be retrieved from a database.

20 Claims, 13 Drawing Sheets

(56) References Cited

FOREIGN PATENT DOCUMENTS

| CN | 106649853 | A | | 5/2017 |
|---|---|---|---|---|
| CN | 106709875 | A | | 5/2017 |
| CN | 106886599 | A | * | 6/2017 |
| CN | 107679250 | A | | 2/2018 |
| CN | 108205580 | A | | 6/2018 |
| JP | 2017040972 | A | | 2/2017 |
| WO | 2017006648 | A1 | | 1/2017 |
| WO | 2017023551 | A2 | | 2/2017 |

OTHER PUBLICATIONS

English translation of the Written Opinion of the International Search Authority in the international application No. PCT/CN2018/104891 dated Nov. 26, 2018.
Chen, Zhenfang et al. "Aggregated Deep Feature from Activation Clusters for Particular Object Retrieval", Oct. 2017.
Evan Shelhamer et al., "Fully Convolutional Networks for Semantic Segmentation", <IEEE Transactions on Pattern Analysis and Machine Intelligence>, vol. 39, No. 4, Apr. 30, 2017, section 1-3.
Ke Sheng-cai et al., "Image Retrieval Based on Convolutional Neural Network and Kernel-Based Supervised Hashing", Acta Electronica Sinica, vol. 45, No. 1, Jan. 15, 2017, entire document.
First Office Action of the Japanese application No. 2019-571060, dated Feb. 24, 2021.
Song L.W. & Zeng Z.-Y., Image Retrieval Based on Multi-scale Deep Convolutional Features. Journal of Fujian Normal University (Natural Science Edition), Sep. 30, 2016, vol. 32, No. 5, pp. 17-23 p. 20 line 18—p. 21 line 30 Citation is not enclosed due to copyright restrictions.
Zheng L. et al., SIFT Meets CNN: A Decade Survey of Instance Retrieval. IEEE Transactions on Pattern Analysis and Machine Intelligence, May 30, 2017, vol. 40, No. 5, pp. 1224-1244 Section 3.4.1, retrieved from J. Latex Class Files.
First Written Opinion of the Singaporean application No. 11202000081X, dated Nov. 17, 2021.

* cited by examiner

IMAGE RETRIEVAL METHODS AND APPARATUSES, DEVICES, AND READABLE STORAGE MEDIA

CROSS-REFERENCE TO RELATED APPLICATIONS

The present application is a continuation of International Application No. PCT/CN2018/104891 filed on Sep. 10, 2018, which claims priority to Chinese Patent Application 201710891875.9 filed on Sep. 27, 2017. The disclosures of these applications are hereby incorporated by reference in their entirety.

BACKGROUND

Image retrieval refers to a task of retrieving, from a database, an image that is most similar to a given image to be retrieved. Image retrieval is an important issue in computer vision and image analysis. Image retrieval has important applications in many fields, such as commodity recommendation, security monitoring, and medical diagnoses.

Although the industry invests plenty of effort in researching image retrieval, it is unfortunate that image retrieval is still a complicated and difficult problem. The retrieval accuracy and efficiency of image retrieval are affected by many factors. This is because on one hand, a complicated image background often has great interference on a Region of Interest (ROI), thereby affecting the accuracy of retrieval. On the other hand, in a large-scale image retrieval process, there are often a million of or even more images; however, image retrieval is a task which requires very high timeliness, and therefore requires definitely efficient and fast image retrieval algorithms. However, many existing image retrieval algorithms are often unable to accurately and efficiently provide effective retrieval solutions for images having complicated backgrounds or small ROIs, and therefore are unable to extract good features for retrieval.

SUMMARY

The present disclosure relates to the field of computer vision, and in particular, to image retrieval methods and apparatus, devices, and readable storage media.

The present disclosure provides image retrieval methods and apparatus, devices, and readable storage media to accurately and efficiently retrieve images having complicated backgrounds and/or small ROIs.

A first aspect of the present disclosure provides an image retrieval method, including: respectively performing a dimension reduction operation on convolutional layer features of an image to be retrieved to obtain dimension-reduced features, a dimension of each dimension-reduced feature being smaller than a dimension of a respective one of the convolutional layer features; clustering the dimension-reduced features to obtain a plurality of clustering features; performing feature fusion on the plurality of clustering features to obtain a global feature; and retrieving, on the basis of the global feature, the image to be retrieved from a database.

A second aspect of the present disclosure provides an image retrieval apparatus, including: a memory storing processor-executable instructions; and a processor arranged to execute the stored processor-executable instructions to perform steps of: respectively performing a dimension reduction operation on convolutional layer features of an image to be retrieved to obtain dimension-reduced features, a dimension of each dimension-reduced feature being smaller than a dimension of a respective one of the convolutional layer features; clustering the dimension-reduced features to obtain a plurality of clustering features; performing feature fusion on the plurality of clustering features to obtain a global feature; and retrieving, on the basis of the global feature, the image to be retrieved from a database.

A third aspect of the present disclosure provides an image retrieval apparatus, including: a dimension reduction module configured to respectively perform a dimension reduction operation on convolutional layer features of an image to be retrieved to obtain dimension-reduced features, a dimension of each dimension-reduced feature being smaller than a dimension of a respective one of the convolutional layer features; a clustering module configured to perform clustering on the basis of the dimension-reduced features to obtain a plurality of clustering features; a fusion module configured to perform feature fusion on the plurality of clustering features to obtain a global feature; and a retrieval module configured to retrieve, on the basis of the global feature, the image to be retrieved from a database.

A fourth aspect of the present disclosure provides a device, including a memory, a processor, and a computer program which is stored in the memory and can be run on the processor, where when executing the computer program, the processor implements the following operations: respectively performing a dimension reduction operation on convolutional layer features of an image to be retrieved to obtain dimension-reduced features, a dimension of each dimension-reduced feature being smaller than a dimension of a respective one of the convolutional layer features; clustering the dimension-reduced features to obtain a plurality of clustering features; performing feature fusion on the plurality of clustering features to obtain a global feature; and retrieving, on the basis of the global feature, the image to be retrieved from a database.

A fifth aspect of embodiments of the present disclosure provides a non-transitory computer readable storage medium with a computer program stored thereon, where when being executed by a processor, the computer program implements the following operations: respectively performing a dimension reduction operation on convolutional layer features of an image to be retrieved to obtain dimension-reduced features, a dimension of each dimension-reduced feature being smaller than a dimension of a respective one of the convolutional layer features; clustering the dimension-reduced features to obtain a plurality of clustering features; performing feature fusion on the plurality of clustering features to obtain a global feature; and retrieving, on the basis of the global feature, the image to be retrieved from a database.

BRIEF DESCRIPTION OF THE DRAWINGS

To describe the technical solutions in embodiments of the present disclosure more clearly, the accompanying drawings required for describing the embodiments or the prior art are briefly introduced below. Apparently, the accompanying drawings in the following description show merely some embodiments of the present disclosure, and a person of ordinary skill in the art can still derive other accompanying drawings from these accompanying drawings without creative efforts.

DETAILED DESCRIPTION

The following descriptions are for description but are not for limitation. Specific details such as a structure of a specific system and a technology are provided for thoroughly understanding the embodiments of the present invention. However, persons skilled in the art should be clear that, the present disclosure can also be implemented in other embodiments without these specific details. In other cases, detailed descriptions about a well-known system, apparatus, circuit, and method are omitted, so as to prevent unnecessary details from hindering the description about the present disclosure.

In order to describe the technical solutions according to the present disclosure, description is provided below by means of specific embodiments.

Figure 1A:
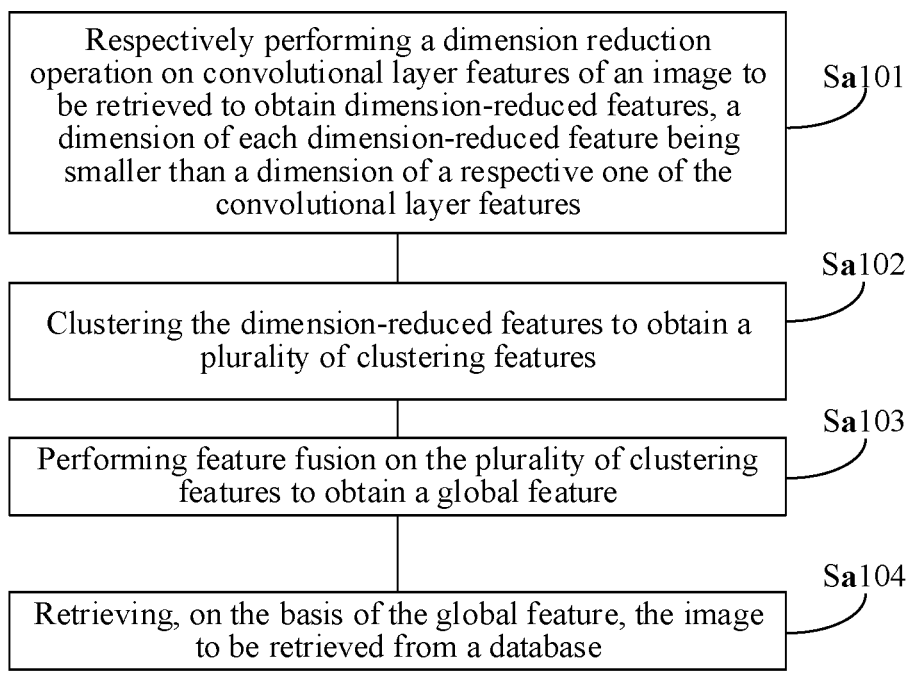
FIG. 1A is an optional schematic flowchart of an image retrieval method provided in an embodiment of the present disclosure.

FIG. 1A is an optional schematic flowchart of an image retrieval method provided in an embodiment of the present disclosure, including the following operations Sa101 to Sa104 which are described in detail as follows.

In operation Sa101, a dimension reduction operation is respectively performed on convolutional layer features of an image to be retrieved to obtain dimension-reduced features, a dimension of each dimension-reduced feature being smaller than a dimension of a respective one of the convolutional layer features.

Respectively performing a dimension reduction operation on convolutional layer features of an image to be retrieved is based on such facts that: 1) multicolinearity and forecasting variables are associated with each other, for example, multicolinearity causes the instability of a solution space, and therefore may cause the incoherence of a result; 2) a high-dimensional space has sparsity, and researches show that 68% of values of one-dimensional normal distribution is between a positive standard deviation and a negative standard deviation, and only 0.02% of values of a ten-dimensional space is between the positive standard deviation and the negative standard deviation; 3) too many variables interfere the creation of a searching rule; 4) analysis on variables only may cause the ignorance of a potential relationship between the variables, for example, a plurality of forecasting variables may fall within a group that only reflect a feature in a given aspect of data; 5) the most valuable information is centralized in the front part of a high-dimensional vector, and the rear part is often noise; and 6) dimension reduction facilitates the fast and efficient clustering of features, and reduces the effect of noise that affects the features. There, the purposes of the dimension reduction operation include: reducing the number of forecasting variables, ensuring that these forecasting variables are independent from each other, providing a frame to explain a result, etc.

In operation Sa102, the dimension-reduced features are clustered to obtain a plurality of clustering features.

In operation Sa103, feature fusion is performed on the plurality of clustering features to obtain a global feature.

In operation Sa104, on the basis of the global feature, the image to be retrieved is retrieved from a database.

It can be known from the image retrieval method illustrated in the aforementioned FIG. 1A that: on one hand, by respectively performing a dimension reduction operation on convolutional layer features of an image to be retrieved, ROIs can be changed into any shapes, such that the effect of noise on an image retrieval result is reduced; and on the other hand, by performing a clustering operation on the basis of the dimension-reduced features to obtain a plurality of clustering region features, the effect of factors, such as illumination, angles, and shields, on an image feature is reduced to the maximum extent.

Figure 1B:
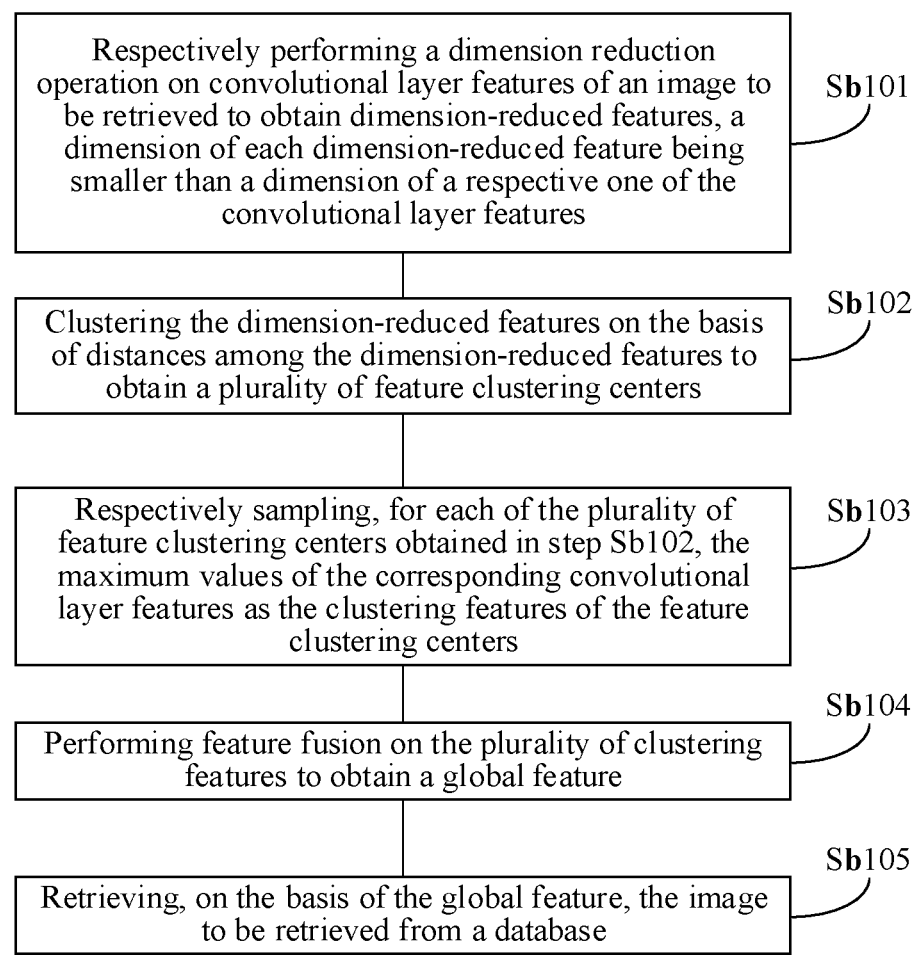
FIG. 1B is an optional schematic flowchart of the image retrieval method provided in an embodiment of the present disclosure.

FIG. 1B is an optional schematic flowchart of the image retrieval method provided in an embodiment of the present disclosure, including the following operations Sb101 to Sb105 which are described in detail as follows.

In operation Sb101, a dimension reduction operation is respectively performed on convolutional layer features of an image to be retrieved to obtain dimension-reduced features, a dimension of each dimension-reduced feature being smaller than a dimension of a respective one of the convolutional layer features.

Before the respectively performing a dimension reduction operation on convolutional layer features of an image to be retrieved, inputting the image to be retrieved to a convolutional neural network to obtain the convolutional layer features is further included. The convolutional neural network is obtained by learning a neural network; that is, the convolutional neural network is obtained by pre-learning the weight of a neural network by means of an image classification task or a distance learning task, and then discarding a full connection layer of the neural network structure and only reserving parameters of a convolutional layer thereof, including the weight, offset, etc., of a convolutional kernel. Then the image to be retrieved is input to the convolutional neural network such that the convolutional neural network outputs the convolutional layer features of the image to be retrieved. The convolutional neural network includes a convolutional layer and a downsampling layer, and the convolutional layer features herein respectively represent features of corresponding pixel areas in the image to be retrieved. For example, if a pixel area has 8*8 pixel units, the number of the convolutional layer features is (the number of pixels included in the height of the image to be retrieved/8)*(the number of pixels included in the width of the image to be retrieved/8). For another example, if a pixel area has 16*16 pixel units, the number of the convolutional layer features is (the number of pixels included in the height of the image to be retrieved/16)*(the number of pixels included in the width of the image to be retrieved/16).

It should be noted that the dimension of the dimension-reduced features in the aforementioned embodiments is determined according to the accuracy of retrieval. Generally, the dimension of the convolutional layer features before the dimension reduction is far greater than that of the dimension-reduced features. For example, the dimension of the convolutional layer features before the dimension reduction is 256 or 512, and the dimension of the dimension-reduced features is 5.

It can be known from the embodiments that: on one hand, by extracting the convolutional layer features and making, using the strong expression capability of the convolutional layer features of the convolutional neural network, semantically similar images be also similar in a feature space, the effect of factors, such as illumination, angles, and shields, on an image feature is reduced, such that the accuracy or quality of image retrieval is improved; and on the other hand, by performing a dimension reduction operation on convolutional layer features of an image to be retrieved, ROIs of the image to be retrieved can be changed into any shapes, such that the effect of noise on an image retrieval result is reduced.

In the embodiments of the present disclosure, the convolutional layer features of the image to be retrieved is a set of D-dimensional features of the image to be retrieved at H*W positions in an image space. The respectively performing a dimension reduction operation on convolutional layer features of an image to be retrieved to obtain dimension-reduced features is reducing the D-dimensional features of the image to be retrieved at H*W positions in an image space as C-dimensional features of the image to be retrieved at the H*W positions in the image space. Obviously, C herein is smaller than D, and H and W are respectively the height and the width of the image to be retrieved.

In operation Sb102, the dimension-reduced features are clustered on the basis of distances among the dimension-reduced features to obtain a plurality of feature clustering centers.

Here, the dimension-reduced features, in the dimension-reduced features of the image to be retrieved, having equivalent distances thereamong, are clustered into a feature clustering center, such that a plurality of feature clustering center is constituted. If the distances between every two features meet a set condition, for example, falling within a preset distance threshold range, it is determined that the distances between every two features are equivalent.

In operation Sb103, for each of the plurality of feature clustering centers obtained in operation Sb102, a maximum value of corresponding convolutional layer features is respectively sampled as the clustering feature of the feature clustering center.

It should be noted that, in the aforementioned operation Sb103, the corresponding convolutional layer feature indicates the convolutional layer feature corresponding to each dimension-reduced feature comprised in each feature clustering center, and the number of the clustering features is 32. The number of the clustering features may also be another numerical value used according to the accuracy of retrieval. The number herein is only described as an example. By performing a clustering operation on the basis of the dimension-reduced features to obtain a plurality of clustering region features, the effect of factors, such as illumination, angles, and shields, on an image feature is reduced to the maximum extent.

In operation Sb104, feature fusion is performed on the plurality of clustering features to obtain a global feature.

The performing feature fusion on the plurality of clustering features to obtain a global feature includes: respectively performing regression processing on each of the plurality clustering features to obtain regressed clustering features; and adding the regressed clustering features to obtain the global feature. The respectively performing regression processing on each of the plurality clustering features to obtain regressed clustering features includes: respectively and sequentially performing normalization processing, whitening processing and renormalization processing on each of the plurality of clustering features to obtain the regressed clustering features.

In operation Sb105, on the basis of the global feature, the image to be retrieved is retrieved from a database.

As an embodiment of the present disclosure, the retrieving, on the basis of the global feature, the image to be retrieved from a database includes: obtaining, from the database on the basis of the global feature, K images having top-K similarities to the image to be retrieved, K being an integer greater than or equal to 1.

The K images having top-K similarities to the image to be retrieved are obtained by sorting the similarities between images in the database and the image to be retrieved according to the distances between the global feature and the features of the images in the database.

Because the smaller the distances between the image features of the images in the database and the global feature, the more similar the images with the image to be retrieved or the higher the similarities between the images and the image to be retrieved, the aforementioned embodiment obtains, according to such a rule, the K images having top-K similarities to the image to be retrieved by sorting the similarities between the images in the database and the image to be retrieved. Here, the obtaining, from the database on the basis of the global feature, K images having top-K similarities to the image to be retrieved includes: computing distances between the global feature and image features in the database; and obtaining, from the database on the basis of the distances between the global feature and the image features in the database, K images having least-K distances to the global feature as the K images having top-K similarities to the image to be retrieved After the obtaining, from the database, K images having top-K similarities to the image to be retrieved, the method further includes: presenting the K images and the similarities between the respective K images and the image to be retrieved.

It can be known from the image retrieval method illustrated in FIG. 1A and FIG. 1B that: on one hand, by respectively performing a dimension reduction operation on convolutional layer features of an image to be retrieved, ROIs can be changed into any shapes, such that the effect of noise on an image retrieval result is reduced; and on the other hand, by performing a clustering operation on the basis of the dimension-reduced features to obtain a plurality of clustering region features, the effect of factors, such as illumination, angles, and shields, on an image feature is reduced to the maximum extent.

Figure 1C:
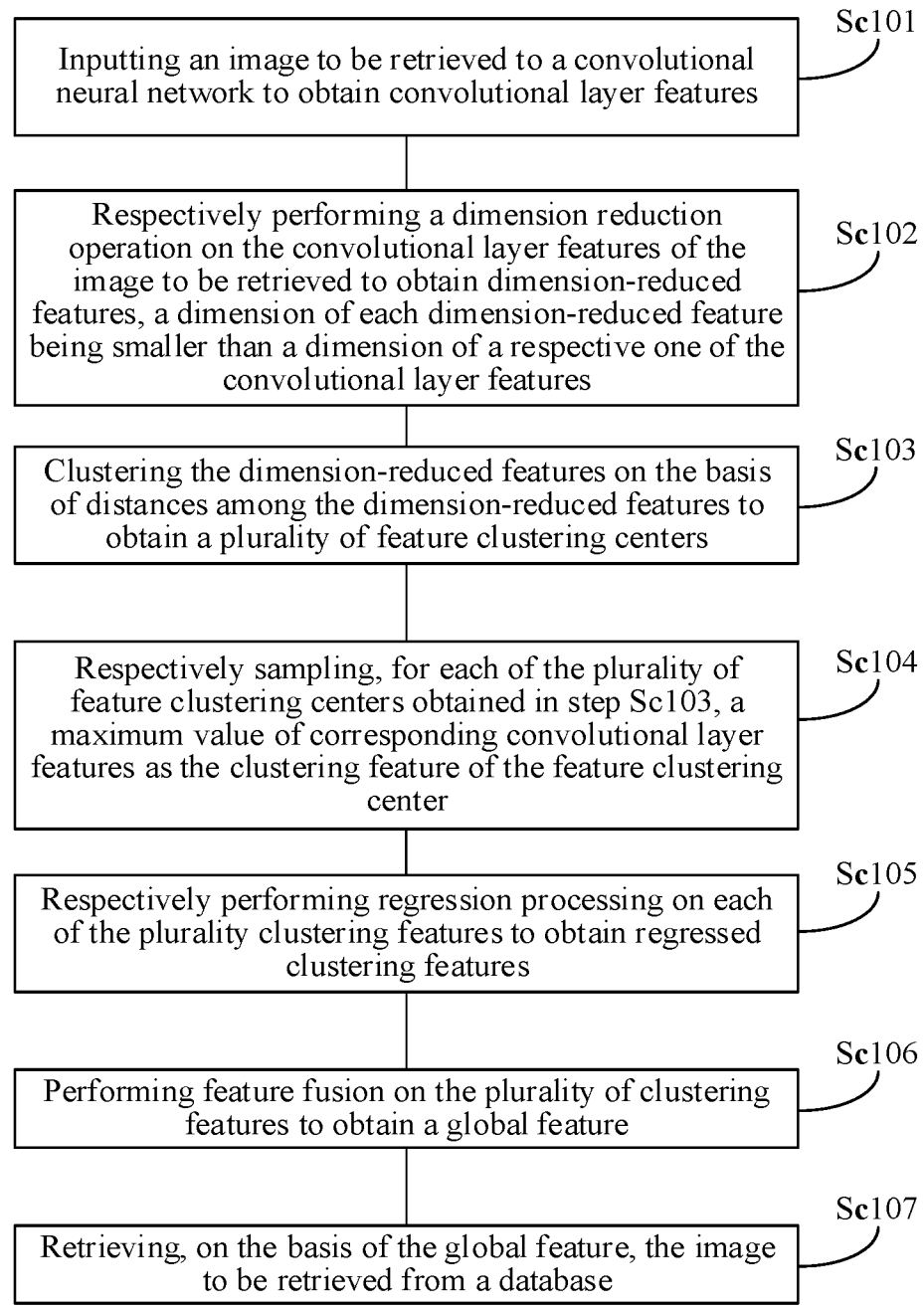
FIG. 1C is an optional schematic flowchart of the image retrieval method provided in an embodiment of the present disclosure.

FIG. 1C is an optional schematic flowchart of the image retrieval method provided in an embodiment of the present disclosure, comprising the following operations Sc101 to Sc107 which are described in detail as follows.

In operation Sc101, the image to be retrieved is input to a convolutional neural network to obtain the convolutional layer features.

The convolutional neural network is obtained by learning a neural network; that is, the convolutional neural network is obtained by pre-learning the weight of a neural network by means of an image classification task or a distance learning task, and then discarding a full connection layer of the neural network structure and only reserving parameters of a convolutional layer thereof, including the weight, offset, etc., of a convolutional kernel. Then the image to be retrieved is input to the convolutional neural network such that the convolutional neural network outputs the convolutional layer features of the image to be retrieved. The convolutional neural network includes a convolutional layer and a downsampling layer, and the convolutional layer features herein respectively represent features of corresponding pixel areas in the image to be retrieved. For example, if a pixel area has 8*8 pixel units, the number of the convolutional layer features is (the number of pixels included in the height of the image to be retrieved/8)*(the number of pixels included in the width of the image to be retrieved/8). For another example, if a pixel area has 16*16 pixel units, the number of the convolutional layer features is (the number of pixels included in the height of the image to be retrieved/16)*(the number of pixels included in the width of the image to be retrieved/16).

In operation Sc102, a dimension reduction operation is respectively performed on convolutional layer features of an image to be retrieved to obtain dimension-reduced features, a dimension of each dimension-reduced feature being smaller than a dimension of a respective one of the convolutional layer features.

As an embodiment of the present disclosure, the respectively performing a dimension reduction operation on convolutional layer features of an image to be retrieved to obtain dimension-reduced features is performing dimension reduction using Principal Component Analysis (PCA). A PCA method relates to replacing n old features before the dimension reduction with a smaller number of m new features. The new features are linear combinations of the old features. These linear combinations maximize sample variances to make the m new features to be irrelative with each other as much as possible, and the mapping from the old features to the new features captures the inherent variability in data.

It should be noted that the respectively performing a dimension reduction operation on convolutional layer features of an image to be retrieved of the present disclosure is not limited to be implemented by the aforementioned PCA method, and may also be implemented using other methods, such as factor analysis or user-defined composition. Therefore, the aforementioned PCA method is not used to limit the present disclosure.

In the embodiments of the present disclosure, the convolutional layer features of the image to be retrieved is a set of D-dimensional features of the image to be retrieved at H*W positions in an image space. The respectively performing a dimension reduction operation on convolutional layer features of an image to be retrieved to obtain dimension-reduced features is reducing the D-dimensional features of the image to be retrieved at H*W positions in an image space as C-dimensional features of the image to be retrieved at the H*W positions in the image space. Obviously, C herein is smaller than D, and H and W are respectively the height and the width of the image to be retrieved.

In operation Sc103, the dimension-reduced features are clustered on the basis of distances among the dimension-reduced features to obtain a plurality of feature clustering centers.

The dimension-reduced features, in the dimension-reduced features of the image to be retrieved, having equivalent distances thereamong, are clustered into a feature clustering center, such that a plurality of feature clustering center is finally constituted. If the distances between every two features meet a set condition, for example, falling within a preset distance threshold range, it is determined that the distances between every two features are equivalent.

In operation Sc104, for each of the plurality of feature clustering centers obtained in operation Sb103, a maximum value of corresponding convolutional layer features is respectively sampled as the clustering feature of the feature clustering center.

It should be noted that, in the aforementioned operation Sc104, the corresponding convolutional layer feature refers to the convolutional layer feature corresponding to each dimension-reduced feature comprised in each feature clustering center, and the number of the clustering features is 32. The number of the clustering features may also be other numerical values used according to the accuracy of retrieval. The number herein is only described as an example.

By performing a clustering operation on the basis of the dimension-reduced features to obtain a plurality of clustering region features, the effect of factors, such as illumination, angles, and shields, on an image feature is reduced to the maximum extent.

In operation Sc105, regression processing is respectively performed on each of the plurality clustering features to obtain regressed clustering features.

The respectively performing regression processing on each of the plurality clustering features to obtain regressed clustering features includes: respectively and sequentially performing normalization processing, whitening processing and renormalization processing on each of the plurality of clustering features to obtain the regressed clustering features.

In operation Sc106, the regressed clustering features are added to obtain a global feature.

In operation Sc107, on the basis of the global feature, the image to be retrieved is retrieved from a database.

As an embodiment of the present disclosure, the retrieving, on the basis of the global feature, the image to be retrieved from a database includes: obtaining, from the database on the basis of the global feature, K images having top-K similarities to the image to be retrieved, K being an integer greater than or equal to 1.

The K images having top-K similarities to the image to be retrieved are obtained by sorting the similarities between images in the database and the image to be retrieved according to the distances between the global feature and the features of the images in the database.

Because the smaller the distances between the image features of the images in the database and the global feature, the more similar the images with the image to be retrieved or the higher the similarities between the images and the image to be retrieved, the aforementioned embodiment obtains, according to such a rule, the K images having top-K similarities to the image to be retrieved by sorting the similarities between the images in the database and the image to be retrieved.

Here, the obtaining, from the database on the basis of the global feature, K images having top-K similarities to the image to be retrieved includes: computing distances between the global feature and image features in the database; and obtaining, from the database on the basis of the distances between the global feature and the image features in the database, K images having least-K distances to the global feature as the K images having top-K similarities to the image to be retrieved After the obtaining, from the database, K images having top-K similarities to the image to be retrieved, the method further includes: presenting the K images and the similarities between the respective K images and the image to be retrieved.

Figure 2:
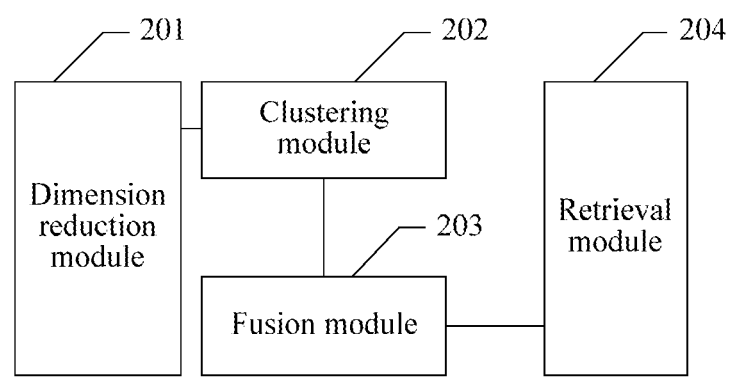
FIG. 2 is an optional schematic structural composition diagram of an image retrieval apparatus provided in an embodiment of the present disclosure.

FIG. 2 is an optional schematic structural composition diagram of an image retrieval apparatus provided in an embodiment of the present disclosure, including a dimension reduction module 201, a clustering module 202, a fusion module 203, and a retrieval module 204 which are described in detail as follows.

The dimension reduction module 201 is configured to respectively perform a dimension reduction operation on convolutional layer features of an image to be retrieved to obtain dimension-reduced features, where a dimension of each dimension-reduced feature is smaller than a dimension of a respective one of the convolutional layer features, and the dimension of the dimension-reduced features is 5.

The clustering module 202 is configured to perform clustering on the basis of the dimension-reduced features to obtain a plurality of clustering features, where the number of the clustering features is 32.

The fusion module 203 is configured to perform feature fusion on the plurality of clustering features to obtain a global feature.

The retrieval module 204 is configured to retrieve, on the basis of the global feature, the image to be retrieved from a database.

It should be noted that because the apparatus provided in the embodiment of the present disclosure is based on the same concept as the method embodiments of the present disclosure, the yielded technical effect is the same as that of the method embodiments of the present disclosures. Please refer to the descriptions in the method embodiments of the present disclosure for detailed content. Descriptions are not made herein in detail.

Figure 3:
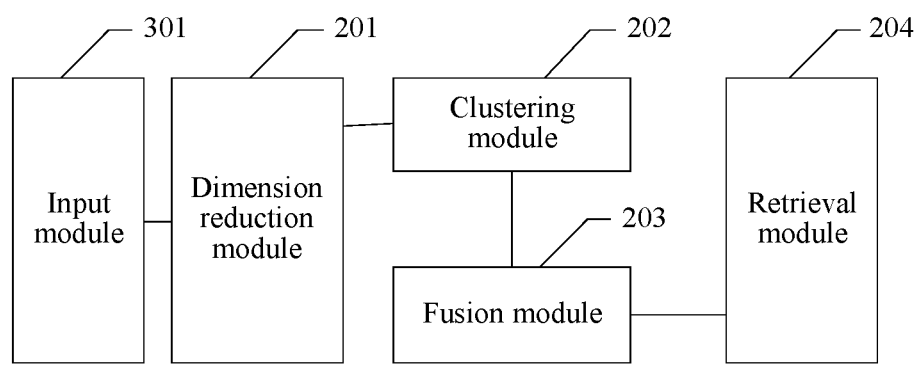
FIG. 3 is an optional schematic structural composition diagram of the image retrieval apparatus provided in an embodiment of the present disclosure.

The image retrieval apparatus illustrated in FIG. 2 further includes an input module 301, for example, the image retrieval apparatus illustrated in FIG. 3. The input module 301 is configured to input the image to be retrieved to a convolutional neural network to obtain the convolutional layer features, where each of the convolutional layer features respectively represents a feature of a corresponding pixel area in the image to be retrieved.

Figure 4:
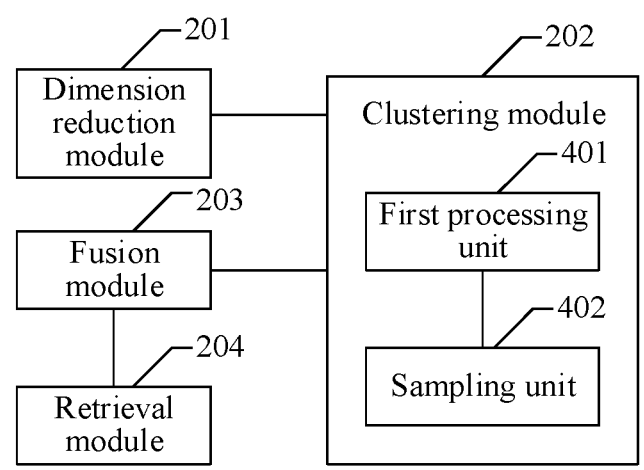
FIG. 4 is an optional schematic structural composition diagram of the image retrieval apparatus provided in an embodiment of the present disclosure.

The clustering module 201 illustrated in FIG. 2 includes a first processing unit 401 and a sampling unit 402, for example, the image retrieval apparatus illustrated in FIG. 4, where the first processing unit 401 is configured to cluster the dimension-reduced features on the basis of the distances among the dimension-reduced features to obtain a plurality of feature clustering centers; and the sampling unit 402 is configured to respectively sample, for each of the plurality of feature clustering centers, a maximum value of corresponding convolutional layer features as the clustering feature of the feature clustering center.

Figure 5:
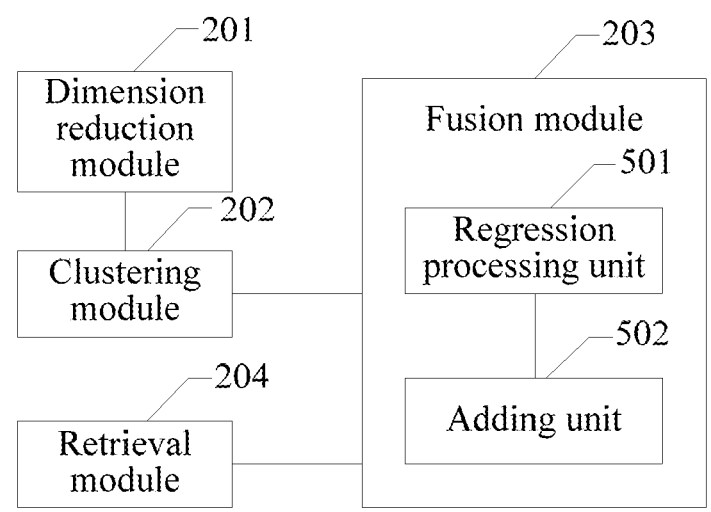
FIG. 5 is an optional schematic structural composition diagram of the image retrieval apparatus provided in an embodiment of the present disclosure.

The fusion module 203 illustrated in FIG. 2 includes a regression processing unit 501 and an adding unit 502, for example, the image retrieval apparatus illustrated in FIG. 5, where the regression processing unit 501 is configured to respectively perform regression processing on each of the plurality clustering features to obtain regressed clustering features; and the adding unit 502 is configured to add the regressed clustering features to obtain the global feature.

Figure 6:
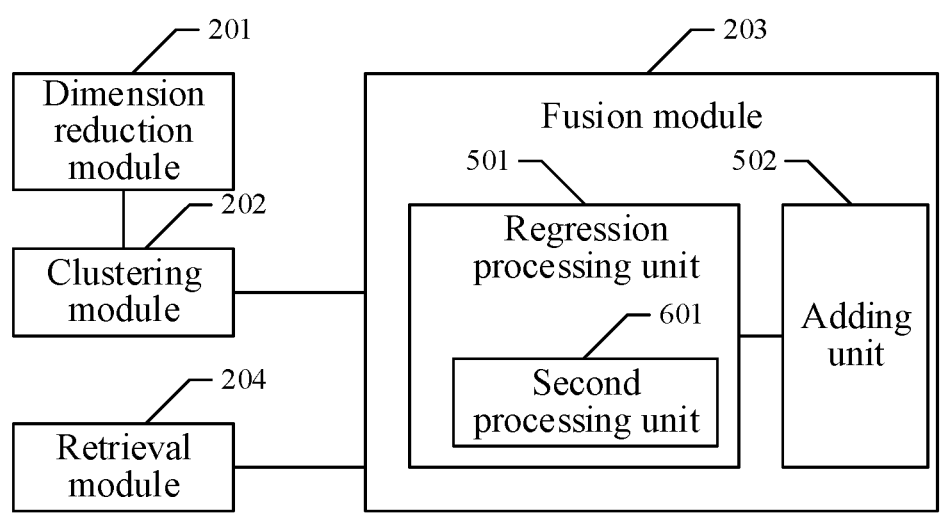
FIG. 6 is an optional schematic structural composition diagram of the image retrieval apparatus provided in an embodiment of the present disclosure.

The regression processing unit 501 illustrated in FIG. 5 comprises a second processing unit 601, for example, the image retrieval apparatus illustrated in FIG. 6. The second processing unit 601 is configured to respectively and sequentially perform normalization processing, whitening processing and renormalization processing on each of the plurality of clustering features to obtain the regressed clustering features.

Figure 7:
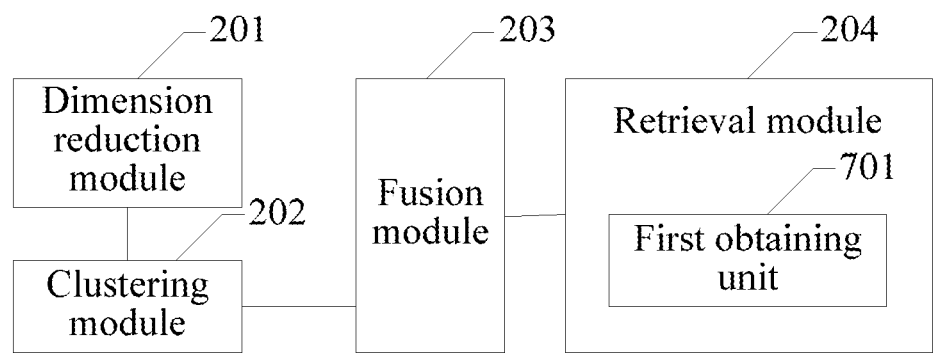
FIG. 7 is an optional schematic structural composition diagram of the image retrieval apparatus provided in an embodiment of the present disclosure.

The retrieval module 204 illustrated in FIG. 2 includes a first obtaining unit 701, for example, the image retrieval apparatus illustrated in FIG. 7. The first obtaining unit 701 is configured to obtain, from the database on the basis of the global feature, K images having top-K similarities to the image to be retrieved, where K is an integer greater than or equal to 1.

Figure 8:
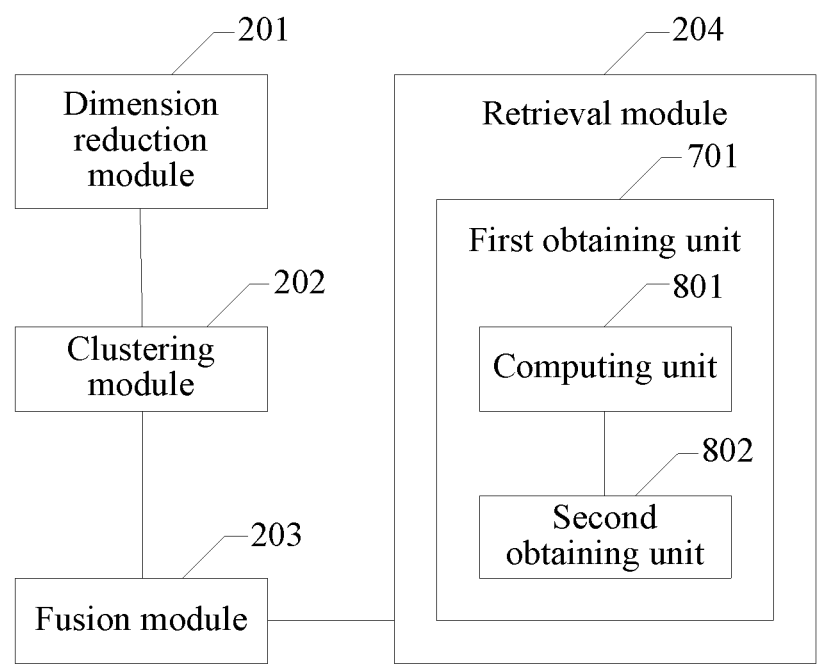
FIG. 8 is an optional schematic structural composition diagram of the image retrieval apparatus provided in an embodiment of the present disclosure.

The first obtaining unit 701 illustrated in FIG. 7 includes a computing unit 801 and a second obtaining unit 802, for example, the image retrieval apparatus illustrated in FIG. 8, where the computing unit 801 is configured compute distances between the global feature and image features in the database, and the second obtaining unit 802 is configured to obtain, from the database on the basis of the distances between the global feature and the image features in the database, K images having least-K distances to the global feature as the K images having top-K similarities to the image to be retrieved.

Figure 9A:
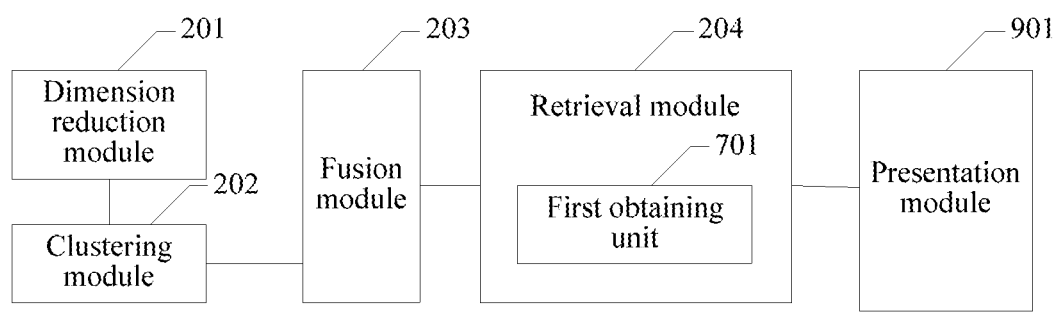
FIG. 9A is an optional schematic structural composition diagram of the image retrieval apparatus provided in an embodiment of the present disclosure.
Figure 9B:
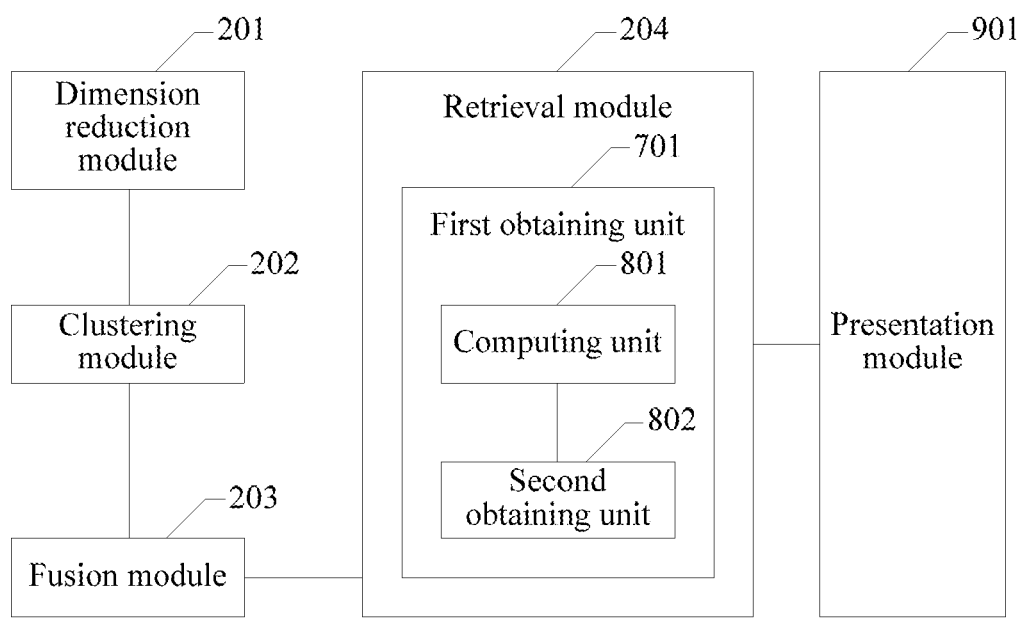
FIG. 9B is an optional schematic structural composition diagram of the image retrieval apparatus provided in an embodiment of the present disclosure.

The image retrieval apparatus illustrated in FIG. 7 or FIG. 8 further includes a presentation module 901, for example, the image retrieval apparatus illustrated in FIG. 9A or FIG. 9B. The presentation module 901 is configured to present the K images having top-K similarities to the image to be retrieved and the similarities between the respective K images and the image to be retrieved.

Figure 10:
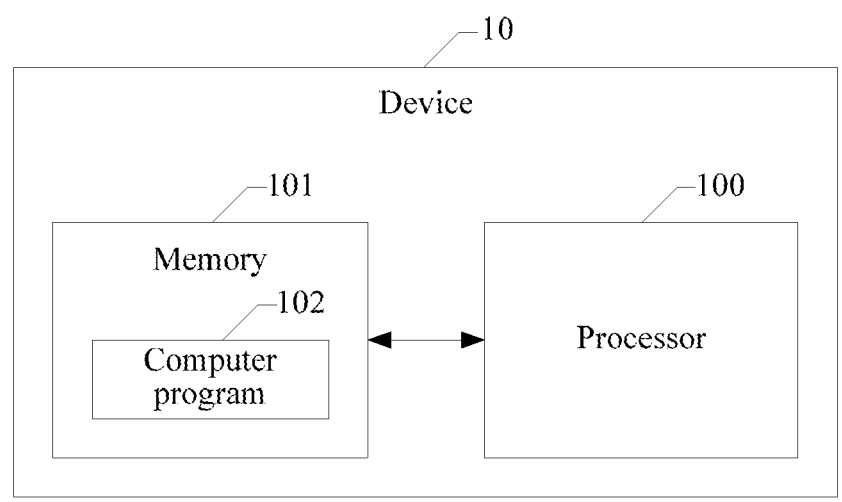
FIG. 10 is a schematic structural diagram of a device provided in an embodiment of the present disclosure.

FIG. 10 is an optional schematic structural diagram of a device provided in an embodiment of the present disclosure. As illustrated in FIG. 10, a device 10 of the embodiment includes a processor 100, a memory 101, and a computer program 102 which is stored in the memory 101 and can be run on the processor 100, for example, the program of the image retrieval method. When executing the computer program 102, the processor 100 implements the operations in the aforementioned embodiments of the image retrieval method, for example, operations Sa101 to Sa104 illustrated in FIG. 1A. Alternatively, when executing the computer program 102, the processor 100 implements the functions of the modules/units in the aforementioned embodiments of the apparatus, for example, the functions of the dimension reduction module 201, the clustering module 202, the fusion module 203, and the retrieval module 204 illustrated in FIG. 2.

As an example, the computer program 102 of the image retrieval method includes: respectively performing a dimension reduction operation on convolutional layer features of an image to be retrieved to obtain dimension-reduced features, a dimension of each dimension-reduced feature being smaller than a dimension of a respective one of the convolutional layer features; clustering the dimension-reduced features to obtain a plurality of clustering features; performing feature fusion on the plurality of clustering features to obtain a global feature; and retrieving, on the basis of the global feature, the image to be retrieved from a database. The computer program 102 may be segmented into one or more modules/units which are stored in the memory 101 and executed by the processor 100 to complete the present disclosure. The one or more modules/units may be a series of computer program instruction segments capable of completing particular functions, the instruction segments being configured to described the execution process of the computer program 102 in the computing device 10. For example, the computer program 102 may be segmented into the functions of the dimension reduction module 201, the clustering module 202, the fusion module 203, and the retrieval module 204 (modules in a virtual apparatus). The functions of the modules are as follows: the dimension reduction module 201 is configured to respectively perform a dimension reduction operation on convolutional layer features of an image to be retrieved to obtain dimension-reduced features, a dimension of each dimension-reduced feature being smaller than a dimension of a respective one of the convolutional layer features; the clustering module 202 is configured to perform clustering on the basis of the dimension-reduced features to obtain a plurality of clustering features; the fusion module 203 is configured to perform feature fusion on the plurality of clustering features to obtain a global feature; and the retrieval module 204 is configured to retrieve, on the basis of the global feature, the image to be retrieved from a database.

The device 10 includes, but not limited to, the processor 100, and the memory 101. Persons skilled in the art can understand that FIG. 10 is merely an example of the device 10 and does not form a limitation to the device 10, and the device may include more or less components than those shown in the drawing, or combines some components, or uses different components. For example, the device may further include an input/output device, a network access device, a bus, or the like.

The processor 100 may be a Central Processing Unit (CPU) and may also be another general purpose processor, a Digital Signal Processor (DSP), an Application Specific Integrated Circuit (ASIC), a Field-Programmable Gate Array (FPGA), or another programmable logic device, a discrete gate or transistor logic device, a discrete hardware assembly, or the like. The general purpose processor may be a microprocessor, or the processor may be any conventional processor or the like.

The memory 101 may be an internal storage unit of the device 10, such as a hard disk drive or memory of the device 10. The memory 101 may also be an external storage device of the device 10, such as an insertion-type hard disk drive, a Smart Media Card (SMC), a Secure Digital (SD) card, and a flash card configured on the device 10. Furthermore, the memory 101 may also include both the internal storage unit and the external storage device of the device 10. The memory 101 is configured to store a computer program or other programs and data the device needs. The memory 101 may further be configured to temporarily store data that has been output or is to be output.

In an exemplary embodiment, the embodiment of the present disclosure further provides a computer readable storage medium, for example, the memory 101 comprising a computer program. The computer program is executed by the processor 100 in the device to implement to the foregoing operations of the image retrieval method. The computer readable storage medium may be a memory such as FRAM, ROM, PROM, EPROM, EEPROM, a flash memory, a magnetic surface memory, an optical disc, or CD-ROM, and may also be any device comprising one or any combination of the aforementioned memories, such as a mobile phone, a computer, a tablet device, or a personal digital assistant.

A computer readable storage medium has a computer program stored thereon, where when being run by a processor, the computer program implements the image retrieval method provided in the aforementioned embodiments of the present disclosure.

Persons skilled in the art can clearly understand that for convenience and brevity of description, the division of the aforementioned functional units or modules is described as examples. In the practical application, the aforementioned function allocations can be achieved by different functional units or modules as needed. That is, the internal structure of the apparatus is divided into different functional units or modules to achieve all or some of the functions described above. The functional units or modules in the embodiments may be integrated into one processing unit, or each of the units may exist alone physically, or two or more units are integrated into one unit, and the integrated unit may be implemented in a form of hardware, or may also be implemented in a form of a software functional unit. In addition, specific names of the functional units or modules are merely for facilitating the differentiation between each other, but are not intended to limit the scope of protection of the present disclosure. For a detailed working process of the foregoing units and modules in the system, reference may be made to a corresponding process in the foregoing method embodiments, and details are not described herein again.

In the aforementioned embodiments, description of the embodiments all have their own focuses, and for portions that are not described in detail or recited in one embodiment, refer to the related description in other embodiments.

Persons of ordinary skill in the art may be aware that, in combination with the examples described in the embodiments disclosed in this specification, units and algorithm operations may be implemented by electronic hardware, or a combination of computer software and electronic hardware. Whether these functions are performed by hardware or software depends on the particular applications and design constraint conditions of the technical solutions. Persons skilled in the art may use different methods to implement the described functions for each particular application, but it should not be considered that the implementation goes beyond the scope of the present disclosure.

It should be understood that the disclosed apparatus/device and method in the embodiments provided in the present disclosure may be implemented by other modes. For example, the apparatus/device embodiments described above are merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by means of some interfaces. The indirect couplings or communication connections between the apparatuses or units may be implemented in electronic, mechanical, or other forms.

The units described as separate parts may or may not be physically separate, and the parts displayed as units may or may not be physical units, may be located in one position, or may be distributed on a plurality of network units. A part of or all of the units may be selected according to actual needs to achieve the objectives of the solutions of the embodiments.

In addition, functional units in the embodiments of the present disclosure may be integrated into one processing unit, or each of the units may exist alone physically, or two or more units may be integrated into one unit. The integrated unit may be implemented in a form of hardware and may also be implemented in a form of a software functional unit.

When the integrated module/unit is implemented in a form of a software functional unit and sold or used as an independent product, the integrated module/unit may be stored in a computer readable storage medium. Based on such an understanding, all or part of procedure in the method according to the embodiments of the present disclosure may be accomplished by a computer program instructing relevant hardware. The computer program for the image retrieval method may be stored in a computer readable storage medium. When being executed by a processor, the computer program implements the operations of the foregoing method embodiments: respectively performing a dimension reduction operation on convolutional layer features of an image to be retrieved to obtain dimension-reduced features, a dimension of each dimension-reduced feature being smaller than a dimension of a respective one of the convolutional layer features; clustering the dimension-reduced features to obtain a plurality of clustering features; performing feature fusion on the plurality of clustering features to obtain a global feature; and retrieving, on the basis of the global feature, the image to be retrieved from a database. The computer program includes a computer program code, and the computer program code may be in source code form, object code form, executable file, or in some intermediate form. The computer readable medium may include: any entity or apparatus capable of carrying a computer program code, a record medium, a USB disk drive, a mobile hard disk drive, a magnetic disk, an optical disk, a computer memory, a Read-Only Memory (ROM), a Random Access Memory (RAM), an electrical carrier signal, a telecommunications signal, a software distribution medium, and the like. It should be noted that the content included in the computer readable medium may be appropriately increased/reduced in accordance with the legislation and the patent practice in a jurisdiction. In some jurisdictions, depending on the legislation and the patent practice, the computer readable medium does not include the electrical carrier signal and the telecommunications signal. The foregoing embodiments are merely intended for describing the technical solutions of the present disclosure other than limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, and such modifications or replacements do not departing the essence of the corresponding technical solutions from the spirit and scope of the technical solutions of the embodiments of the present disclosure and should fall within the scope of protection of the present disclosure.

The invention claimed is:

1. An image retrieval method, comprising:
respectively performing a dimension reduction operation on convolutional layer features of an image to be retrieved to obtain dimension-reduced features, a dimension of each dimension-reduced feature being smaller than a dimension of a respective one of the convolutional layer features;
clustering the dimension-reduced features to obtain a plurality of clustering features;
performing feature fusion on the plurality of clustering features to obtain a global feature; and
retrieving, on the basis of the global feature, the image to be retrieved from a database,
wherein the clustering the dimension-reduced features to obtain a plurality of clustering features comprises:
clustering the dimension-reduced features on the basis of distances among the dimension-reduced features to obtain a plurality of feature clustering centers; and
respectively sampling, for each of the plurality of feature clustering centers, a maximum value of corresponding convolutional layer features as the clustering feature of the feature clustering center.

2. The image retrieval method according to claim 1, further comprising: before the respectively performing a dimension reduction operation on convolutional layer features of an image to be retrieved,
inputting the image to be retrieved to a convolutional neural network to obtain the convolutional layer features.

3. The image retrieval method according to claim 2, wherein each of the convolutional layer features represents a feature of a corresponding pixel area in the image to be retrieved.

4. The image retrieval method according to claim 1, wherein the performing feature fusion on the plurality of clustering features to obtain a global feature comprises:
respectively performing regression processing on each of the plurality clustering features to obtain regressed clustering features; and
adding the regressed clustering features to obtain the global feature.

5. The image retrieval method according to claim 4, wherein the respectively performing regression processing on each of the plurality clustering features to obtain regressed clustering features comprises:
respectively and sequentially performing normalization processing, whitening processing and renormalization processing on each of the plurality of clustering features to obtain the regressed clustering features.

6. The image retrieval method according to claim 1, wherein the retrieving, on the basis of the global feature, the image to be retrieved from a database comprises:
obtaining, from the database on the basis of the global feature, K images having top-K similarities to the image to be retrieved, K being an integer greater than or equal to 1.

7. The image retrieval method according to claim 6, wherein the obtaining, from the database on the basis of the global feature, K images having top-K similarities to the image to be retrieved comprises:
computing distances between the global feature and image features in the database; and
obtaining, from the database on the basis of the distances between the global feature and the image features in the database, K images having least-K distances to the global feature as the K images having top-K similarities to the image to be retrieved.

8. The image retrieval method according to claim 6, further comprising:
presenting the K images and the similarities between the respective K images and the image to be retrieved.

9. The image retrieval method according to claim 1, wherein the dimension of the dimension-reduced features is 5.

10. The image retrieval method according to claim 1, wherein number of the clustering features is 32.

11. An image retrieval apparatus, comprising:
a memory storing processor-executable instructions; and
a processor arranged to execute the stored processor-executable instructions to perform steps of:
respectively performing a dimension reduction operation on convolutional layer features of an image to be retrieved to obtain dimension-reduced features, a dimension of each dimension-reduced feature being smaller than a dimension of a respective one of the convolutional layer features;
clustering the dimension-reduced features to obtain a plurality of clustering features;
performing feature fusion on the plurality of clustering features to obtain a global feature; and
retrieving, on the basis of the global feature, the image to be retrieved from a database,
wherein the clustering the dimension-reduced features to obtain a plurality of clustering features comprises:
clustering the dimension-reduced features on the basis of the distances among the dimension-reduced features to obtain a plurality of feature clustering centers; and
respectively sampling, for each of the plurality of feature clustering centers, a maximum value of corresponding convolutional layer features as the clustering feature of the feature clustering center.

12. The image retrieval apparatus according to claim 11, wherein the processor is arranged to execute the stored processor-executable instructions to further perform a step of:
before the respectively performing a dimension reduction operation on convolutional layer features of an image to be retrieved,
inputting the image to be retrieved to a convolutional neural network to obtain the convolutional layer features.

13. The image retrieval apparatus according to claim 12, wherein each of the convolutional layer feature represents a feature of a corresponding pixel area in the image to be retrieved.

14. The image retrieval apparatus according to claim 11, wherein the performing feature fusion on the plurality of clustering features to obtain a global feature comprises:
respectively performing regression processing on each of the plurality clustering features to obtain regressed clustering features; and
adding the regressed clustering features to obtain the global feature.

15. The image retrieval apparatus according to claim 14, wherein the respectively performing regression processing on each of the plurality clustering features to obtain regressed clustering features comprises:
respectively and sequentially performing normalization processing, whitening processing and renormalization processing on each of the plurality of clustering features to obtain the regressed clustering features.

16. The image retrieval apparatus according to claim 11, wherein the retrieving, on the basis of the global feature, the image to be retrieved from a database comprises
obtaining, from the database on the basis of the global feature, K images having top-K similarities to the image to be retrieved, K being an integer greater than or equal to 1.

17. The image retrieval apparatus according to claim 16, wherein the obtaining, from the database on the basis of the global feature, K images having top-K similarities to the image to be retrieved comprises:
computing distances between the global feature and image features in the database; and
obtaining, from the database on the basis of the distances between the global feature and the image features in the database, K images having least-K distances to the global feature as the K images having top-K similarities to the image to be retrieved.

18. A non-transitory computer readable storage medium having stored thereon computer-readable instructions that, when executed by a processor, cause the processor to implement operations of an image retrieval method, the method comprising:
respectively performing a dimension reduction operation on convolutional layer features of an image to be retrieved to obtain dimension-reduced features, a dimension of each dimension-reduced feature being smaller than a dimension of a respective one of the convolutional layer features;
clustering the dimension-reduced features to obtain a plurality of clustering features;
performing feature fusion on the plurality of clustering features to obtain a global feature; and
retrieving, on the basis of the global feature, the image to be retrieved from a database,
wherein the clustering the dimension-reduced features to obtain a plurality of clustering features comprises:
clustering the dimension-reduced features on the basis of distances among the dimension-reduced features to obtain a plurality of feature clustering centers; and
respectively sampling, for each of the plurality of feature clustering centers, a maximum value of corresponding convolutional layer features as the clustering feature of the feature clustering center.

19. The non-transitory computer readable storage medium according to claim 18, wherein the method further comprises: before the respectively performing a dimension reduction operation on convolutional layer features of an image to be retrieved,
inputting the image to be retrieved to a convolutional neural network to obtain the convolutional layer features.

20. The non-transitory computer readable storage medium according to claim 18, wherein each of the convolutional layer features represents a feature of a corresponding pixel area in the image to be retrieved.

* * * * *